United States Patent [19]

Menzel

[11] 4,190,525
[45] Feb. 26, 1980

[54] LITTER AND REFUSE RECEPTACLE AND SEPARATOR

[76] Inventor: Paul B. Menzel, 523 N. Euclid Ave., Pittsburgh, Pa. 15206

[21] Appl. No.: 945,920

[22] Filed: Sep. 26, 1978

[51] Int. Cl.² ............................................. B07B 1/00
[52] U.S. Cl. ................................. 209/235; 209/252; 119/1
[58] Field of Search ............... 209/233, 235, 370, 374, 209/417, 418, 251, 359, 274, 279, 281, 252, 352, 373, 420, 415, 409; 119/1, 17

[56] References Cited

U.S. PATENT DOCUMENTS

| 2,443,709 | 6/1948 | Pelle | 209/252 X |
|---|---|---|---|
| 2,563,750 | 8/1951 | Rosenbaum | 209/352 X |
| 2,963,003 | 12/1960 | Oberg et al. | 119/1 |
| 3,141,441 | 7/1964 | Russell | 209/374 X |
| 4,117,804 | 10/1978 | Moore et al. | 119/1 |

FOREIGN PATENT DOCUMENTS 155425  12/1920  United Kingdom ..................... 209/279

*Primary Examiner*—Ralph J. Hill
*Attorney, Agent, or Firm*—Robert J. Bird

[57] ABSTRACT

A receptacle for holding a quantity of litter material and for the deposit of refuse. A sifting screen is mounted on mechanism for movement through the bed of litter to sift therefrom the accumulated refuse, leaving the litter bed for further use. In another form, the litter container is configured to be tilted to pass the litter through a centrally placed sifting screen.

3 Claims, 3 Drawing Figures

LITTER AND REFUSE RECEPTACLE AND SEPARATOR

BACKGROUND AND SUMMARY OF THE INVENTION

The invention relates to refuse containment and handling. More particularly the subject matter is a receptacle for holding a bed of litter material and for the deposit of refuse on or into it.

One example or environment for use of this invention is the containment and handling of cat litter. Various products generally known as cat litter or kitty litter are used by owners of domestic cats and other animals similarly behaved. The animals excrete waste on a bed of this particulate litter material which is meant to absorb moisture and odor from the waste. Also, the animals sometimes bury their solid refuse in the litter bed. The litter material is eventually discarded but is usually used for several days before being discarded. In the meantime, it is the general practice to remove accumulations of solid waste for disposal, and this is done by manual search and removal means, as by a spoon or trowel.

The object of this invention is to provide a litter receptacle with mechanical means to separate refuse from the litter bed for its easy disposal.

Briefly, the invention can be summarized as a receptacle including a container for a quantity of litter and a screen to sift refuse from the litter. The screen is either mechanically movable relative to the container and through the litter bed, or the litter bed is movable by gravity through the screen which is stationary on the container.

The details, operation, and benefits of this invention will now be described more specifically with reference to the accompanying drawing.

DRAWING

DESCRIPTION

Figure 1:
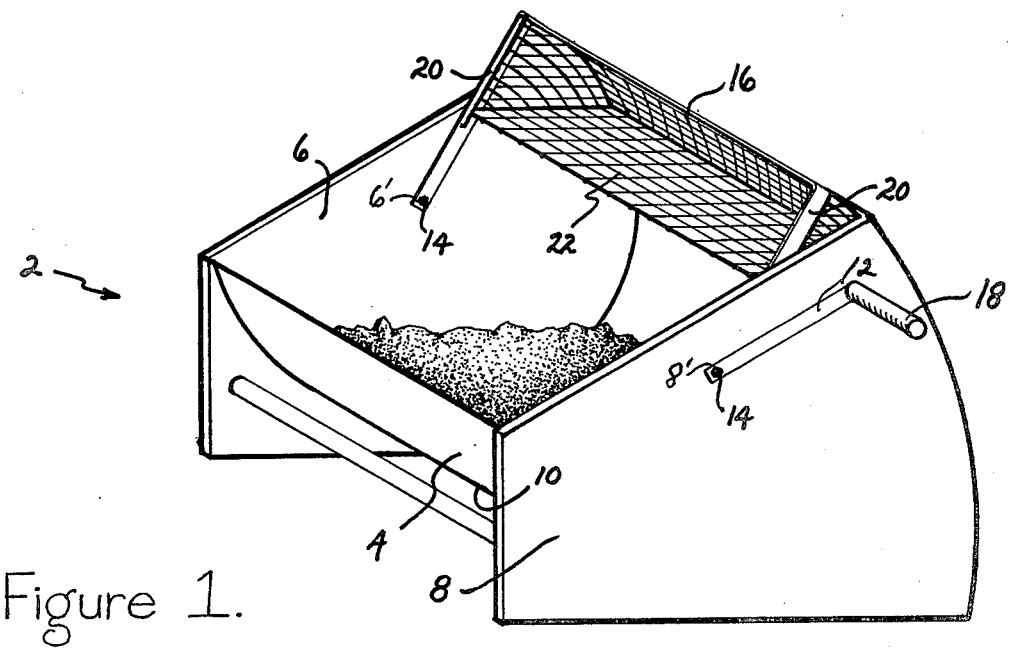
FIG. 1 is a perspective view of a refuse receptacle according to a preferred embodiment of this invention.

In FIG. 1, a receptacle and separator unit is generally indicated at 2. Receptacle 2 includes an upwardly open container 4 formed of end walls 6 and 8 and a curved bottom 10 which is arcuately configured.

A crank mechanism 12 is mounted on the container 4 and includes a crank shaft 14, crank pin 16, and crank handle 18. Crank pin 16 is connected to the shaft 14 by radius arms 20. Shaft 14 is rotatably mounted on the container walls 6 and 8 through pivot apertures 6' and 8' respectively. Pivot apertures 6' and 8' are at the center of curvature of container bottom 10 so that when crank shaft 14 rotates, crank pin 16 describes an arc parallel to the container bottom 10.

A sifting screen member 22 is detachably mounted by suitable fasteners to the crank pin 16 along its length. Screen member 22 is formed of a mesh material which will pass small particulate matter such as sand or litter material but will retain larger particles of refuse. Screen member 22 is in the form of a basket or scoop so as to hold refuse particles sifted by it from the litter material. The crank mechanism is rotatable through 360° on the pivots 6' and 8'. The mechanism is shown at a convenient out-of-the-way position.

In use, container 4 is supplied with a bed of litter material and on this bed refuse is deposited and accumulates. Periodically, the crank mechanism is rotated to move the sifting screen member 22 through the litter bed to sift therefrom accumulated solid refuse. Screen member 22 is then removed from the crank mechanism for convenient disposal of the collected refuse.

Figure 2:
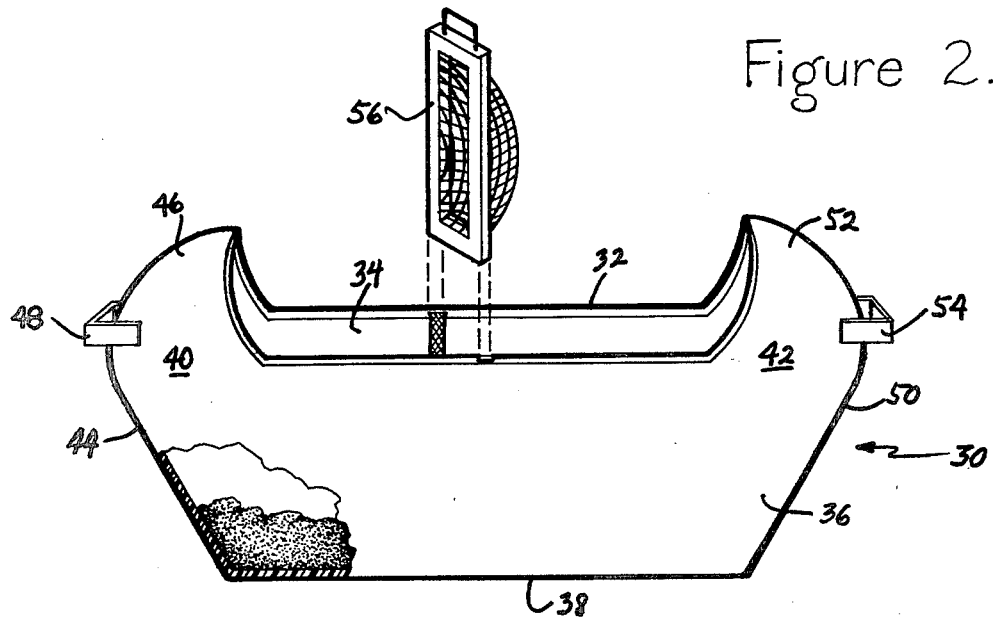
FIG. 2 is a perspective view of a refuse receptacle according to a second embodiment of this invention.

In FIG. 2, a receptacle and separator unit 30 includes an upwardly open container 32 having side walls 34 and 36, a bottom 38, and end portions 40 and 42. End portion 40 includes an inclined end wall 44, a partially inwardly extending roof 46, and a top mounted handle 48. End portion 42 includes an inclined end wall 50, a partially inwardly extending roof 52, and a top mounted handle 54.

Sides 34 and 36 are slotted to provide a way for the insertion and removal of a sifting screen member 56 which is simply set vertically into and lifted vertically from the slots. Screen member 56 is of the same mesh material and serves the same purpose as screen member 22 in FIG. 1. Screen member 56 is configured as a scoop to hold refuse for disposal when the screen is removed.

In the position shown and with the screen 56 removed, the receptacle 30 with a bed of sand or litter material is used for the deposit of refuse. Periodically, one end at a time, say the right end portion 42, is raised passing approximately half the litter bed to the left end. Thus raised, container 32 rests and is stable on end wall 50 while screen member 56 is inserted as shown. The container is then raised at its left end and rested on its right end wall 50 passing the litter bed back through the screen 56. Screen 56 is then removed for disposal of the refuse. The partial roof portions 46 and 52 serve to form end containers so that the entire litter bed is accomodated and none spilled out while the container is in its inclined positions.

Figure 3:
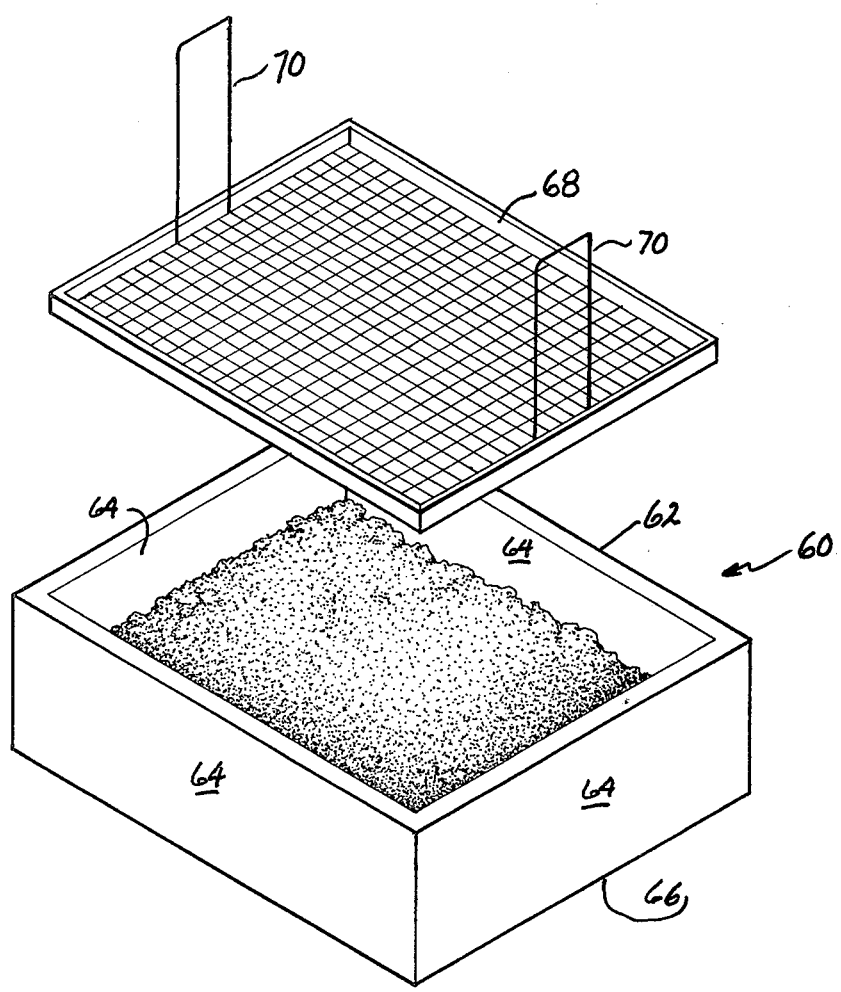
FIG. 3 is a perspective view of a refuse receptacle according to a third embodiment of this invention.

In FIG. 3, a receptacle and separator unit 60 includes and upwardly open box or container 62 having sides 64 and a bottom 66. A sifting screen tray 68 is shaped similarly to bottom member 66 and fits within the container 62. Tray 68 includes handles 70.

A bed of litter material is laid in the container and over the sifting tray. To periodically remove refuse from the litter bed, the sifting tray is simply lifted from the litter bed. Refuse is retained in the tray and litter passes through it to remain in the bed.

What is claimed is:

1. Apparatus for containment of a bed of litter material and for separation from said litter material of refuse deposited thereon, including:
   a frame defining an open receptacle for the containment of litter and refuse,
   a sifting screen member forming a concave scoop operatively connected for movement along a defined locus relative to said frame from an initial position above said litter bed, through said litter bed, and back to said initial position, whereby to traverse substantially the entire body of said litter bed and to sift accumulated refuse therefrom,
   said screen member being detachable from said operative connection to said frame for disposal of the refuse sifted by said screen member.

2. Apparatus as defined in claim 1 in which said screen member is mounted on a crank mechanism for travel along the rotary locus thereof.

3. A receptacle for convenient deposit and periodic removal of refuse, including:
a frame,
an open container supported by said frame for the containment of a bed of litter material and for the convenient deposit of refuse,
a crank mechanism rotatably mounted to said frame and including a handle for manual operation and a crankpin, said crankpin adapted to swing parallel to the bottom of said container, and
a sifting screen member connected to said crankpin for movement therewith through said bed of litter material to sift refuse from said litter, said screen forming a scoop to hold refuse sifted thereby, said screen member being detachably mounted to said crankpin for disposal of said refuse.

* * * * *